(12) United States Patent
Gamaley et al.

(10) Patent No.: US 8,719,289 B2
(45) Date of Patent: May 6, 2014

(54) AUTOMATIC CONTACT LIST ALIASING IN A COLLABORATION SYSTEM

(75) Inventors: Vladimir Gamaley, Rehovot (IL); Gili Nachum, Bet-Shemesh (IL); Gil Perzy, Holon (IL)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 13/483,154

(22) Filed: May 30, 2012

(65) Prior Publication Data

US 2012/0323960 A1 Dec. 20, 2012

Related U.S. Application Data

(63) Continuation of application No. 13/053,800, filed on Mar. 22, 2011, now abandoned.

(51) Int. Cl.
*G06F 7/00* (2006.01)
*G06F 17/30* (2006.01)

(52) U.S. Cl.
USPC .......................................... 707/758; 707/769

(58) Field of Classification Search
CPC ...... G06Q 10/10; G06Q 10/107; G06Q 10/06; G06F 17/30002; G06F 17/30613; G06F 17/30554; G06F 17/30864; H04M 1/274508
USPC .................................................. 707/736–770
See application file for complete search history.

(56) References Cited

U.S. PATENT DOCUMENTS

| 7,225,226 | B2 | 5/2007 | Fitzpatrick et al. | |
|---|---|---|---|---|
| 7,631,266 | B2 | 12/2009 | Werndorfer et al. | |
| 2006/0288298 | A1* | 12/2006 | Haitani et al. | 715/739 |
| 2008/0209347 | A1* | 8/2008 | Malik et al. | 715/758 |
| 2009/0254563 | A1 | 10/2009 | Arnold et al. | |
| 2010/0205546 | A1* | 8/2010 | Appelman et al. | 715/758 |
| 2011/0055234 | A1* | 3/2011 | Miettinen | 707/755 |

* cited by examiner

*Primary Examiner* — Tony Mahmoudi
*Assistant Examiner* — Tuan A Pham
(74) *Attorney, Agent, or Firm* — Patents on Demand P.A.; Brian K. Buchheit; Scott M. Garrett (57) ABSTRACT

In one embodiment, an addition of an identifier to a contact list can be detected. The identifier can identify an entity in a first collaboration system. Data can be searched to find a different identifier that identifies the entity in at least a second collaboration system. The different identifier can be added to the contact list.

25 Claims, 5 Drawing Sheets

AUTOMATIC CONTACT LIST ALIASING IN A COLLABORATION SYSTEM

CROSS-REFERENCE TO RELATED APPLICATION

This application is a continuation of U.S. patent application Ser. No. 13/053,800, filed Mar. 22, 2011 (pending), which is incorporated herein in its entirety.

BACKGROUND

The disclosure relates to computer network-based communications in general, and in particular to real-time collaboration systems.

Real-time collaboration systems, such as instant messaging systems, are increasingly used within and between businesses and other organizations to enhance communications and cooperation between parties. Typically, before two parties can communicate with each other, each party must provide his or her collaboration system with an identifier that the collaboration system uses to identify the other party. Common examples of such identifiers include email addresses and collaboration system-specific user IDs, which are typically maintained in contact lists. Collaboration systems typically provide their users with "presence" notifications regarding the current status of the contacts in their contact lists, such as whether or not a contact is currently logged-in to his/her collaboration system and available to receive communications.

BRIEF SUMMARY

In one aspect of the disclosure, an addition of an identifier to a contact list can be detected. The identifier can identify an entity in a first collaboration system. Data can be searched to find a different identifier that identifies the entity in at least a second collaboration system. The different identifier can be added to the contact list.

In one aspect of the disclosure, a contact list can be established in a first collaboration system. The contact list can include at least one record for an entity. A second collaboration system remotely located from the first collaboration system can be searched for one or more identifiers of the entity. One or more identifiers can be presented via a user interface resulting from the searching. The presenting can occur automatically without a user of the user interface manually inputting the one or more identifiers of the entity. A user selectable option can be provided to add the one or more identifiers to the contact list. Responsive to a user selection of the user selectable option, at least one of the one or more identifiers can be added to the contact list. In absence of the user selection of the user selectable option, the one or more identifiers are not added to the contact list.

Systems and computer program products embodying the above aspects are also provided in the disclosure.

DETAILED DESCRIPTION

It is increasingly common for an individual collaboration system user to have multiple identities, each of which is specific to a different collaboration system, where the user may be logged-in to different collaboration systems at different times. Thus, a collaboration system user who wishes to receive presence notifications regarding a contact who has multiple identities must add each of the contact's multiple identities to his/her contact list. Unfortunately, the user might not be aware that the contact has multiple identities or what these multiple identities are. This problem with conventional approaches was discovered by the inventors of the disclosure in the course of developing the invention.

One embodiment of the disclosure is for managing a contact list in a collaboration system, by detecting the addition of an identifier to a contact list. The identifier can identify an entity in a first collaboration system. Data can be searched to find an identifier that identifies the entity in at least a second collaboration system. The identifier that identifies the entity in the second collaboration system can be added to the contact list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
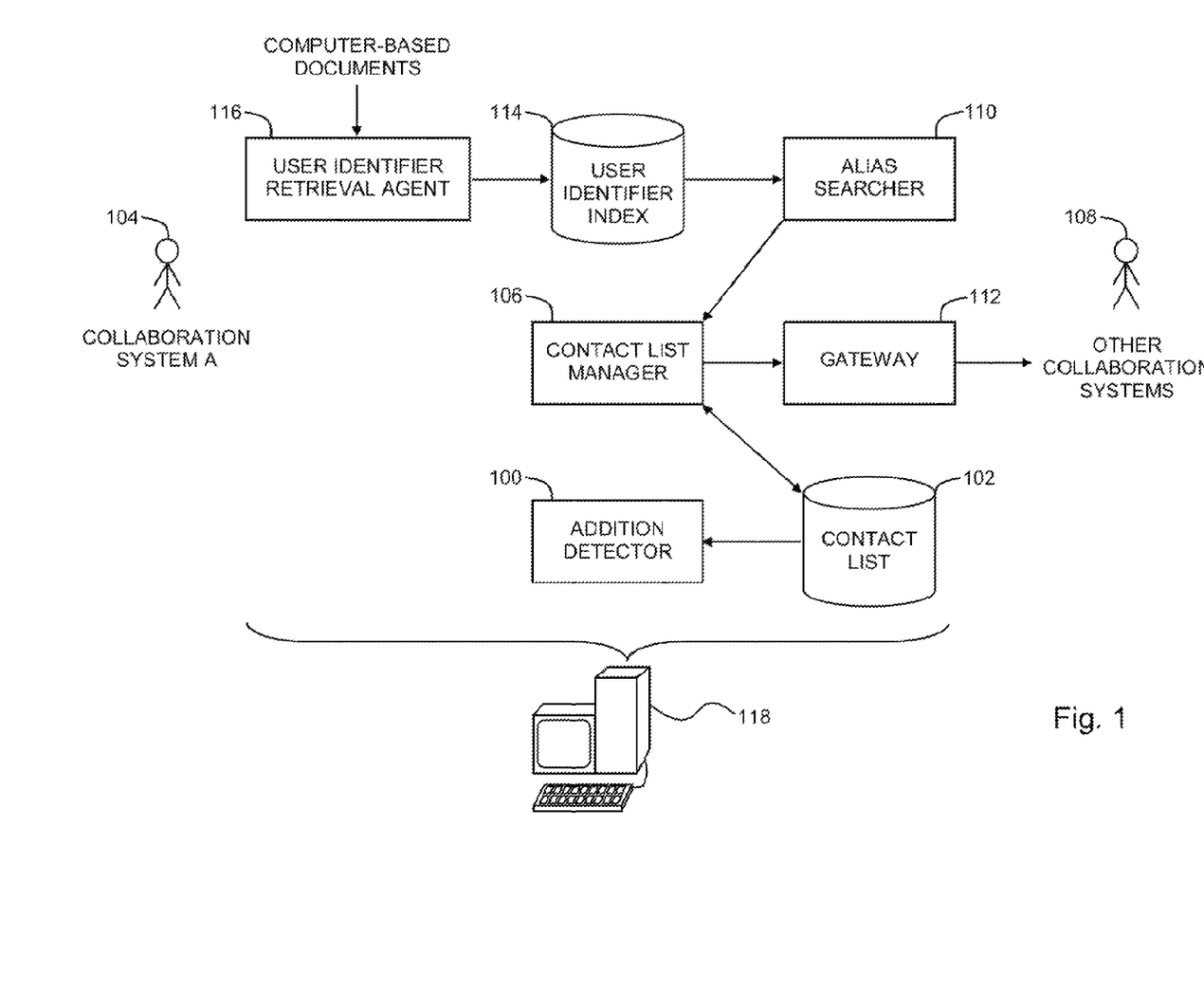
FIG. 1 is an illustration of a system for managing a contact list in a collaboration system, constructed and operative in accordance with an embodiment of the invention.

Reference is now made to FIG. 1 which is an illustration of a system for managing a contact list in a collaboration system, constructed and operative in accordance with an embodiment of the invention. In the system of FIG. 1, an addition detector 100 is configured to detect the addition of an identifier to a contact list 102, such as a contact list of a collaboration system (hereinafter "collaboration system A") like IBM Lotus Sametime™, commercially-available from International Business Machines Corporation, Armonk, N.Y. The identifier (hereinafter "the identifier being added") may, for example, be added to contact list 102 by a user 104 of collaboration system A using a contact list manager 106, where the identifier being added identifies an entity, such as a user 108, belonging to collaboration system A, or belonging to a different collaboration system, such as Yahoo Messenger™, commercially-available from Yahoo! Inc., Sunnyvale, Calif. As used herein, detecting the addition of an identifier to a contact list can mean either detecting the presence of the identifier within the contact list after it has been added to the contact list, and/or detecting any action related to adding the identifier to the contact list even before the identifier is actually inserted into the contact list.

An alias searcher 110 is configured to search data to find one or more identifiers, other than the identifier being added, that identify user 108 in one or more collaboration systems that are external collaboration system A with which collaboration system A communicates, such as via a gateway 112. Alias searcher 110 preferably conducts its search responsive to addition detector 100 detecting the addition to contact list 102 of the identifier being added identifying user 108. Alias searcher 110 preferably searches an index 114 of user identifiers that includes one or more groups of user identifiers, where a group of identifiers includes one or more identifiers identifying the same user. Index 114 may be populated by a user identifier retrieval agent 116 that is configured in accordance with conventional techniques to search computer-based documents in which the identifier being added of user 108 appears, such as email messages and chat histories, to find other identifiers that identify user 108, such as in signature portions of such documents. Additionally or alternatively, alias searcher 110 may itself search such computer-based documents to find other identifiers that identify user 108. Alias searcher 110 preferably presents any identifiers it finds for selection, such as via a computer display for selection by user 104, whereupon contact list manager 106 adds the selected identities of user 108 to contact list 102.

A subscriptions manager 118 is preferably configured to request or otherwise create subscriptions for information regarding user 108, such as for presence notifications regarding the current status user 108, where each of the subscriptions is associated with a different identifier that identifies user 108. Thus, for example, one subscription may be associated with the identifier being added to contact list 102 that was detected by addition detector 100, whereas one or more other subscriptions may be associated with one or more of the other identities of user 108 that were found by alias searcher 110 and selected for addition to contact list 102. Subscriptions that are associated with identifiers that identify user 108 in one or more external collaboration systems with which collaboration system A communicates via a gateway 112 are preferably managed through gateway 112 in accordance with conventional techniques.

Any of the elements shown in FIG. 1 are preferably implemented by one or more computers, such as a computer 118, by implementing any of the elements shown in FIG. 1 in computer hardware and/or in computer software embodied in a non-transient, computer-readable medium in accordance with conventional techniques.

Figure 2:
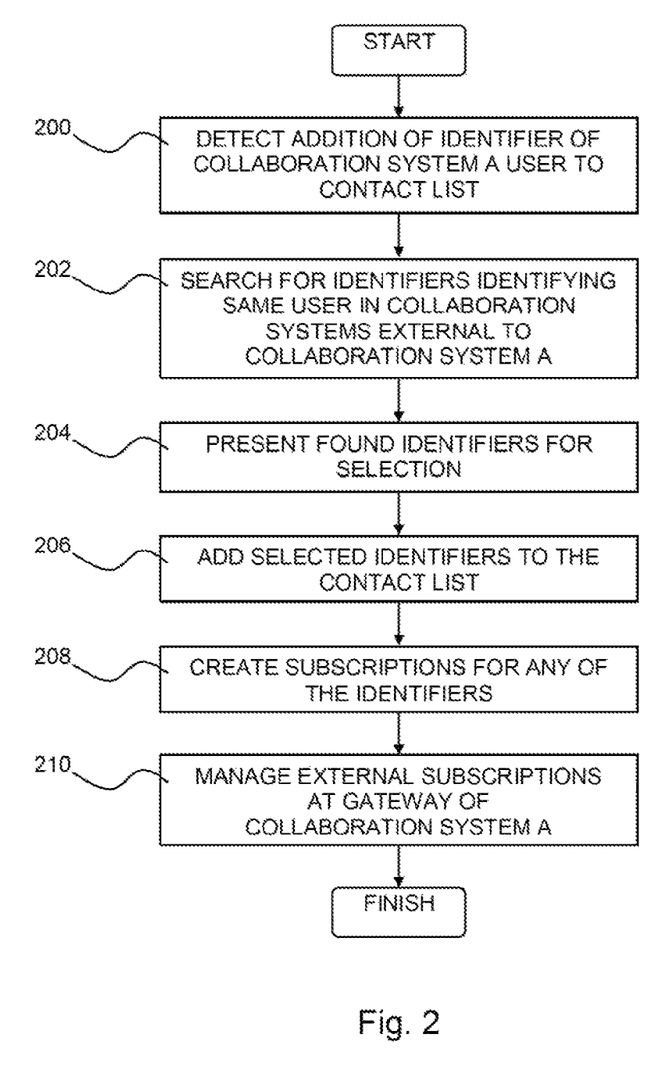
FIG. 2 is a flowchart of a method of operation of the system of FIG. 1, operative in accordance with an embodiment of the invention.

Reference is now made to FIG. 2 which is a flowchart of a method of operation of the system of FIG. 1, operative in accordance with an embodiment of the invention. In the method of FIG. 2, the addition of an identifier (hereinafter "the identifier being added") to a contact list is detected, such as of an identifier that identifies a user of a collaboration system A (step 200). A search is conducted to find one or more identifiers that identify the same user, such as in other collaboration systems that are external to collaboration system A (step 202). Identifiers found during the search are preferably presented for selection, such as by the user to whom the contact list belongs (step 204). Selected identifiers are added to the contact list (step 206). One or more subscriptions are requested or otherwise created for one or more of the identifiers (step 208). Subscriptions that are associated with identifiers that are associated with one or more collaboration systems that are external to collaboration system A are managed through a gateway of collaboration system A (step 210).

Figure 3A:
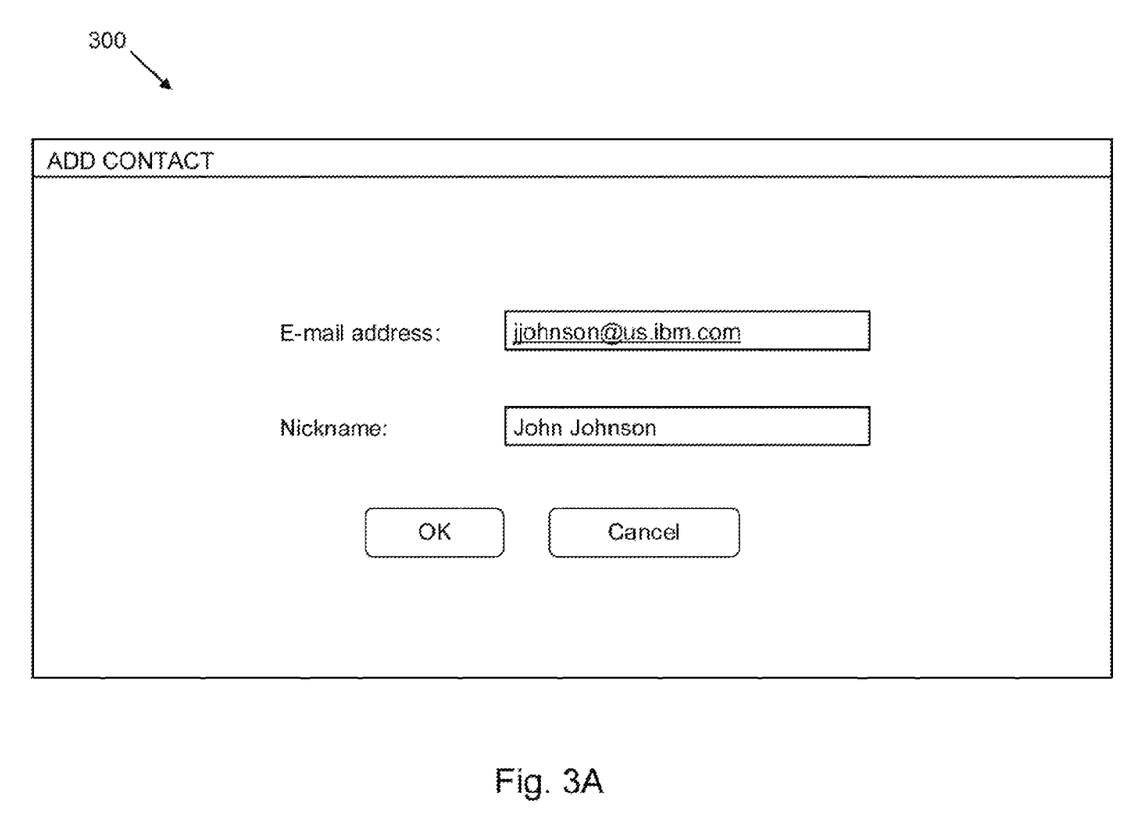
FIGS. 3A and 3B are illustrations of interfaces for use in an operational scenario of the system of FIG. 1 and the method of FIG. 2 in accordance with an embodiment of the invention.
Figure 3B:
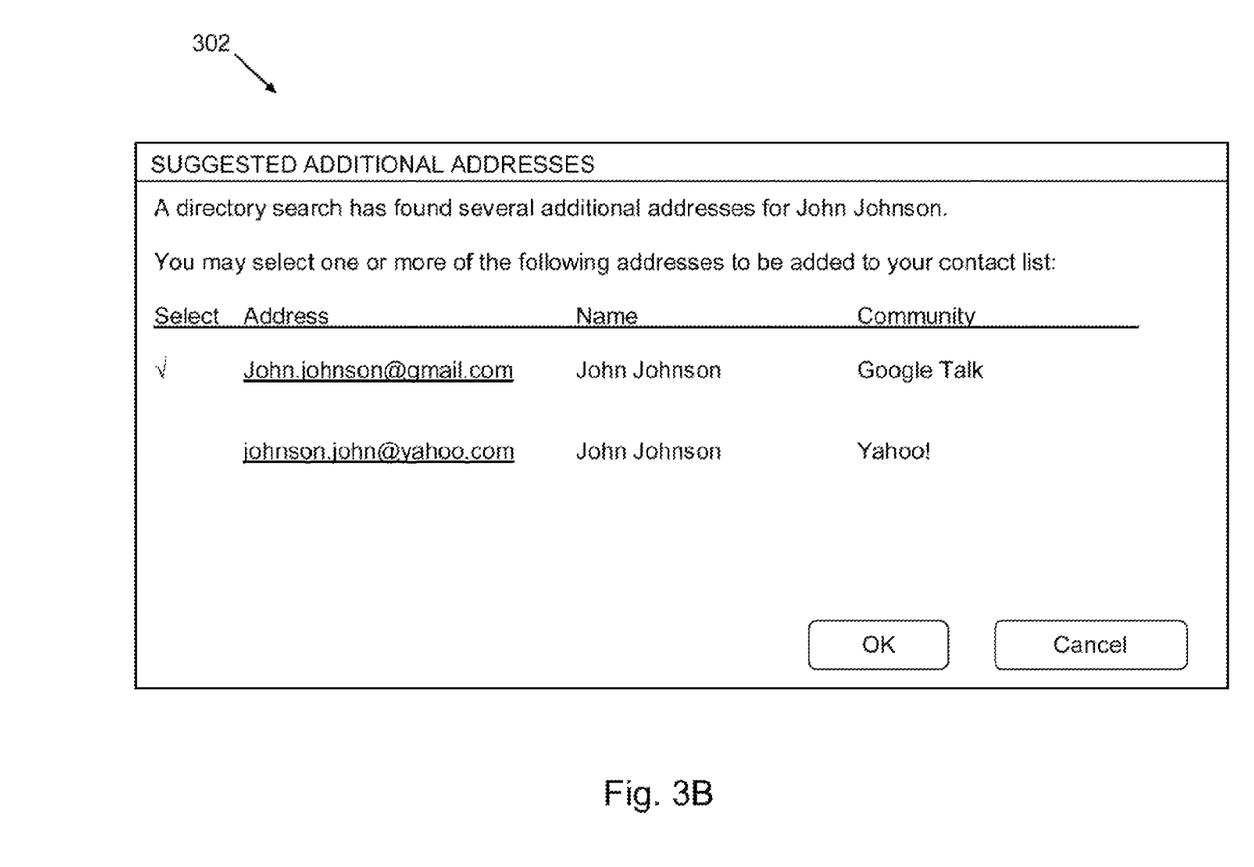

Reference is now made to FIGS. 3A and 3B, which are illustrations of interfaces for use in an operational scenario of the system of FIG. 1 and the method of FIG. 2 in accordance with an embodiment of the invention. In FIG. 3A a window 300 is used by a contact list owner to add the email address of a contact to the contact list. In FIG. 3B a window 302 is presented indicating that one or more additional email addresses were found for the contact being added that identify the contact in collaboration systems belonging to other user communities. The contact list owner is invited to select one or more of the email addresses to be added to the contact list in association with the contact.

Figure 4:
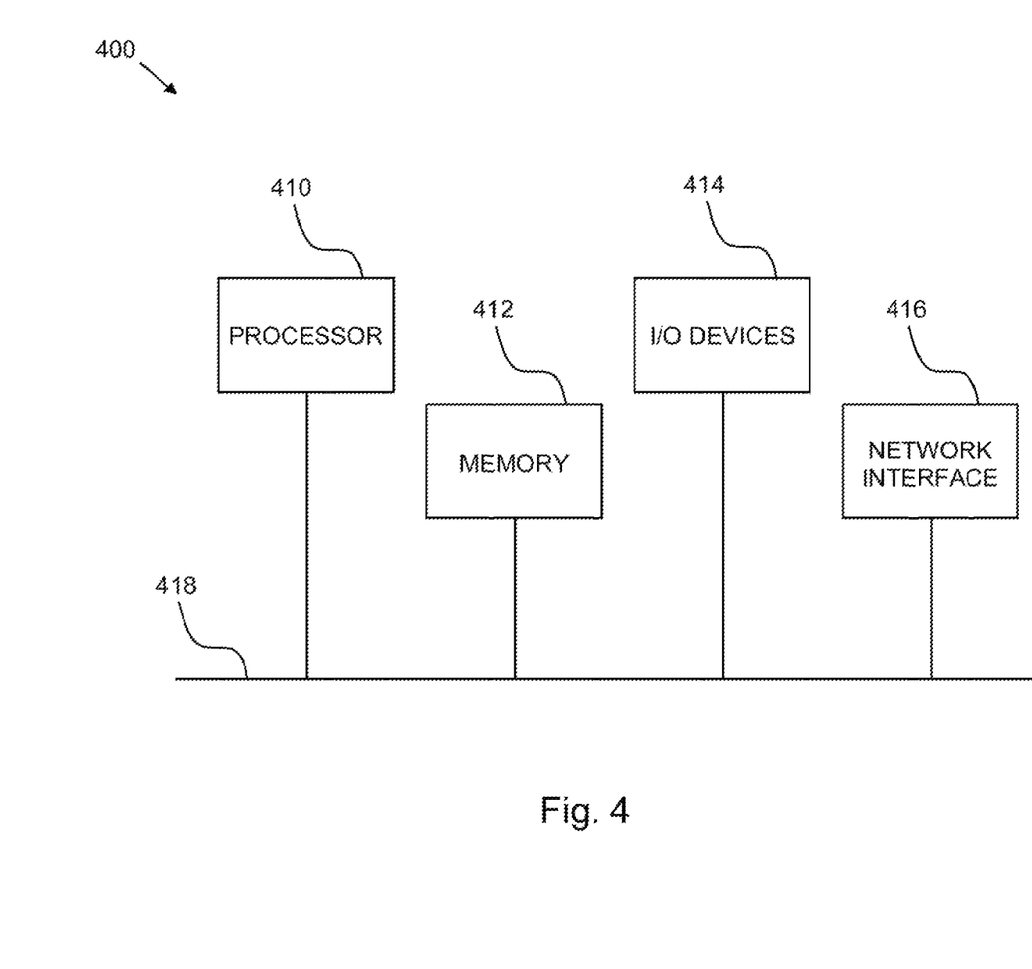
FIG. 4 is a block diagram of a hardware implementation of a computing system, constructed and operative in accordance with an embodiment of the invention.

Referring now to FIG. 4, block diagram 400 illustrates a hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method comprising:
   detecting an addition of an identifier to a contact list, wherein the identifier identifies an entity in a first collaboration system;
   searching data to find a different identifier that identifies the entity in at least a second collaboration system, wherein the searching of data comprises searching an index of user identifiers that includes a group of user identifiers, wherein the group of user identifiers includes a plurality of identifiers identifying the entity, wherein said plurality of identifiers comprise the identifier of the first collaboration system and the different identifier of the second collaboration system;
   providing within a user interface a user selectable option to add the one or more identifiers to the contact list;
   receiving, responsive to presenting the different identifier, user input that indicates the different identifier is to be added to the contact list, wherein the adding of the different identifier occurs responsive to and contingent upon receiving the user input; and
   adding to the contact list of the first collaboration system the different identifier found by searching the second collaboration system, wherein the different identifier is not present in the contact list before the adding, wherein the user selectable option permits the user to select a specific subset of the plurality of identifiers, wherein the user selection is for a subset of the plurality of identifiers, wherein said subset comprises more than one and less than the total number of identifiers of the plurality, wherein the adding of the at least one of the identifiers adds said subset of the identifiers to the contact list, wherein the detecting, searching, providing, receiving, and adding are performed by one or more processors executing program instructions stored on one or more non-transitory storage mediums.

2. The method of claim 1, wherein said second collaboration system is external of the first collaboration system, and wherein said first collaboration system and said second collaboration system are remotely located from each other and are connected to each other via a network.

3. The method of claim 2, wherein said identifier and said different identifier are both email addresses of the entity.

4. The method according to claim 1 wherein the searching step comprises:
searching at least one computer-based document containing said identifier of the first collaboration system; and
finding within the computer-based document said different identifier that identifies the entity in the second collaboration system, wherein the adding of the different identifier to the contact list occurs responsive to the finding.

5. The method according to claim 1, wherein the searching occurs responsive to detecting the addition of the identifier, and wherein the adding occurs responsive to finding the different identifier.

6. The method according to claim 1 and further comprising:
presenting, via a computer-controlled output device, the different identifier that identifies the entity in the second collaboration system; and
receiving, responsive to presenting the different identifier, user input that indicates the different identifier is to be added to the contact list, wherein the adding of the different identifier occurs responsive to and contingent upon receiving the user input.

7. The method according to claim 1, wherein the detecting of the addition comprises detecting the presence of the identifier within the contact list after it has been added to the contact list.

8. The method according to claim 1, wherein the detecting of the addition comprises detecting an action related to adding the identifier to the contact list before the identifier is inserted into the contact list.

9. A method comprising:
establishing a contact list in a first collaboration system, said contact list comprising at least one record for an entity;
searching a second collaboration system remotely located from said first collaboration system for one or more identifiers of the entity, wherein the searching of data comprises searching an index of user identifiers that includes a group of user identifiers, wherein the group of user identifiers includes a plurality of identifiers identifying the entity, wherein said plurality of identifiers comprise an identifier of the first collaboration system and a different identifier of the second collaboration system;
presenting via a user interface the one or more identifiers of the entity resulting from the searching, wherein the presenting step occurs automatically without a user of the user interface manually inputting the one or more identifiers of the entity;
providing within the user interface a user selectable option to add the one or more identifiers to the contact list; and
responsive to a user selection of the user selectable option, adding at least one of the one or more identifiers to the record of the contact list, wherein in absence of the user selection of the user selectable option, the one or more identifiers are not added to the contact list, wherein the one or more identifiers comprises a plurality of identifiers, wherein the user selectable option permits the user to select a specific subset of the plurality of identifiers, wherein the user selection is for a subset of the plurality of identifiers, wherein said subset comprises more than one and less than the total number of identifiers of the plurality, wherein the adding of the at least one of the identifiers adds said subset of the identifiers to the contact list, wherein the establishing, searching, presenting, providing, and adding are performed by one or more processors executing program instructions stored on one or more non-transitory storage mediums.

10. The method of claim 9, wherein the one or more identifiers comprises a plurality of different email addresses for the entity.

11. The method of claim 9, wherein the established contact list comprises a first identifier for the entity, wherein the searching of the second collaboration system comprises matching the first identifier to a set of records, each record being for a corresponding entity and each record comprising a plurality of different identifiers associated with the corresponding entity, wherein the entity is contained in one of the records of the set of records, said one record comprising the one or more identifiers and said first identifier.

12. The method of claim 9, further comprising:
detecting a user adding an identifier for the entity to the contact list; and
responsive to the detecting of the user adding the identifier, initiating the searching of the second collaboration system for the one or more identifiers, which are different from said identifier being added by the user.

13. A system for managing a contact list in a collaboration system, the system comprising:
one or more processors;
one or more non-transitory storage mediums storing program instructions executable by at least one of the one or more processors;
an addition detector comprising at least a subset of the program instructions, wherein said addition detector is configured to detect the addition of an identifier to a contact list, wherein the identifier identifies an entity in a first collaboration system, wherein said identifier is used to communicate with the entity;
an alias searcher comprising at least a subset of the program instructions, wherein said, alias searcher is configured to search data to find a different identifier that identifies the entity in at least a second collaboration system, wherein the alias searcher is configured to:
search an index of user identifiers that includes a group of user identifiers, wherein the group of user identifiers includes a plurality of identifiers identifying the entity, wherein said plurality of identifiers comprises said identifier of the first collaboration system and said different identifier;
search at least one computer-based document containing the identifier that identifies the entity in the first collaboration system;
find within the computer-based document the different identifier that identifies the entity in the second collaboration system;
present, via a computer-controlled output device, the different identifier that identifies the entity in the second collaboration system; and
receive, responsive to presenting the different identifier, user input that indicates the different identifier is to be added to the contact list, wherein the adding of the different identifier occurs responsive to and contingent upon receiving the user input; and
a contact list manager comprising at least a subset set of the program instructions, wherein said contact list manager is configured to add to the contact list the different identifier, wherein the different identifier is not present in the contact list before being added to the contact list by the contact list manager;
a user interface comprising a user selectable option to add the one or more identifiers to the contact list, wherein the user selectable option permits the user to select a specific subset of the plurality of identifiers, wherein the user selection is for a subset of the plurality of identifiers, wherein said subset comprises more than one and less than the total number of identifiers of the plurality.

14. The system according to claim 13, wherein the alias searcher is configured to search responsive to the addition of the identifier.

15. The system according to claim 13, wherein the addition detector is configured to detect the presence of the identifier within the contact list after it has been added to the contact list.

16. The system according to claim 13, wherein the addition detector is configured to detect an action related to adding the identifier to the contact list before the identifier is inserted into the contact list.

17. The system according to claim 13, further comprising: a subscriptions manager comprising at least a subset of the program instructions, wherein said subscriptions manager is configured to create subscriptions for presence notifications of the entity, wherein separate subscriptions are created for the identifier and the different identifier.

18. The system according to claim 13, wherein the alias searcher is configured to search data to find the different identifier in response to the identifier being added to the contact list, wherein the identifier is not present in the contact list before being added to the contact list.

19. A computer program product comprising:
a non-transitory computer-readable storage medium; and
computer-readable program code embodied in the non-transitory computer-readable storage medium, wherein the computer-readable program code comprises a set of instructions able to be executed by a processor, wherein said computer-readable program code is configured to:
detect the addition of an identifier to a contact list, wherein the identifier identifies an entity in a first collaboration system, wherein said identifier is used to communicate with the entity;
search data to find a different identifier that identifies the entity in at least a second collaboration system, wherein the searching of data comprises searching an index of user identifiers that includes a group of user identifiers, wherein the group of user identifiers includes a plurality of identifiers identifying the entity, wherein said plurality of identifiers comprise the identifier of the first collaboration system and the different identifier of the second collaboration system;
provide within a user interface a user selectable option to add the one or more identifiers to the contact list;
receive, responsive to presenting the different identifier, user input that indicates the different identifier is to be added to the contact list, wherein the adding of the different identifier occurs responsive to and contingent upon receiving the user input; and
add to the contact list of the first collaboration system the different identifier found by searching the second collaboration system, wherein the different identifier is not present in the contact list before the adding, wherein the user selectable option permits the user to select a specific subset of the plurality of identifiers, wherein the user selection is for a subset of the plurality of identifiers, wherein said subset comprises more than one and less than the total number of identifiers of the plurality, wherein the adding of the at least one of the identifiers adds said subset of the identifiers to the contact list.

20. The computer program product of claim 19, wherein said second collaboration system is external of the first collaboration system, and wherein said first collaboration system and said second collaboration system are remotely located from each other and are connected to each other via a network, wherein said identifier and said different identifier are both email addresses of the entity, wherein the searching occurs responsive to detecting the addition of the identifier, and wherein the adding occurs responsive to finding the different identifier.

21. The computer program product according to claim 19, wherein the computer readable program code is further configured to create subscriptions for presence notifications of the entity, wherein separate subscriptions are created for the identifier and the different identifier.

22. The computer program product according to claim 19, wherein the computer readable program code is further configured to search data to find the different identifier in response to the identifier being added to the contact list, wherein the identifier is not present in the contact list before being added to the contact list.

23. A computer program product comprising a non-transitory computer readable storage medium having computer usable program code embodied therewith, the computer usable program code comprising:
computer usable program code stored in a non-transitory computer readable storage medium, when said computer usable program code is executed by a processor it is operable to establish a contact list in a first collaboration system, said contact list comprising at least one record for an entity;
computer usable program code stored in a non-transitory computer readable storage medium, when said computer usable program code is executed by a processor it is operable to search data to find a different identifier that identifies the entity in at least a second collaboration system, wherein the searching of data comprises searching an index of user identifiers that includes a group of user identifiers, wherein the group of user identifiers includes a plurality of identifiers identifying the entity, wherein said plurality of identifiers comprise an identifier of the first collaboration system and a different identifier of the second collaboration system;
computer usable program code stored in a non-transitory computer readable storage medium, when said computer usable program code is executed by a processor it is operable to search an index of user identifiers that includes a group of user identifiers, wherein the group of user identifiers includes a plurality of identifiers identifying the entity, wherein said plurality of identifiers comprises said identifier of the first collaboration system and said different identifier;
computer usable program code stored in a non-transitory computer readable storage medium, when said computer usable program code is executed by a processor it is operable to search at least one computer-based document containing the identifier that identifies the entity in the first collaboration system;
computer usable program code stored in a non-transitory computer readable storage medium, when said computer usable program code is executed by a processor it is operable to search data to find a different identifier that identifies the entity in the second collaboration system;
computer usable program code stored in a non-transitory computer readable storage medium, when said computer usable program code is executed by a processor it is operable to present, via a computer-controlled output device, the different identifier that identifies the entity in the second collaboration system; and computer usable program code stored in a non-transitory computer readable storage medium, when said computer usable program code is executed by a processor it is operable to receive, responsive to presenting the different identifier, user input that indicates the different identifier is to be added to the contact list, wherein the adding of the different identifier occurs responsive to and contingent upon receiving the user input, wherein the one or more identifiers comprises a plurality of identifiers, wherein the user selectable option permits the user to select a specific subset of the plurality of identifiers, wherein the user selection is for a subset of the plurality of identifiers, wherein said subset comprises more than one and less than the total number of identifiers of the plurality, wherein the adding of the at least one of the identifiers adds said subset of the identifiers to the contact list.

24. The computer program product according to claim 23, wherein the computer usable program code stored in at least a non-transitory computer-readable storage medium, when said computer usable program code is executed by a processor it is operable to create subscriptions for presence notifications of the entity, wherein separate subscriptions are created for the identifier and the different identifier.

25. The computer program product according to claim 23, wherein the computer usable program code stored in a non-transitory computer-readable storage medium, when said computer usable program code is executed by a processor it is operable to search data to find the different identifier in response to the identifier being added to the contact list, wherein the identifier is not present in the contact list before being added to the contact list.

* * * * *